United States Patent
Walker et al.

(10) Patent No.: US 7,218,991 B2
(45) Date of Patent: May 15, 2007

(54) SYSTEM FOR VENDING PHYSICAL AND INFORMATION ITEMS

(75) Inventors: Jay S. Walker, Ridgefiled, CT (US); Daniel E. Tedesco, Westport, CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 10/994,913

(22) Filed: Nov. 22, 2004

(65) Prior Publication Data

US 2005/0109842 A1 May 26, 2005

Related U.S. Application Data

(63) Continuation of application No. 09/713,001, filed on Nov. 17, 2000.

(60) Provisional application No. 60/226,830, filed on Aug. 22, 2000, provisional application No. 60/243,153, filed on Oct. 25, 2000.

(51) Int. Cl.
G06F 17/00 (2006.01)
(52) U.S. Cl. .................. 700/234; 700/232
(58) Field of Classification Search ................ 700/234, 700/232, 233
See application file for complete search history.

(56) References Cited

U.S. PATENT DOCUMENTS

| | | | |
|---|---|---|---|
| 3,609,250 | A | 9/1971 | Morris |
| 3,718,906 | A | 2/1973 | Lightner |
| 3,947,882 | A | 3/1976 | Lightner |
| 4,008,792 | A | 2/1977 | Levasseur et al. |
| 4,237,537 | A | 12/1980 | Pitches et al. |
| 4,245,730 | A | 1/1981 | Bachmann et al. |
| 4,282,575 | A | 8/1981 | Hoskinson et al. |
| 4,412,292 | A | 10/1983 | Sedam et al. |
| 4,454,670 | A | 6/1984 | Bachmann et al. |
| 4,498,570 | A | 2/1985 | King et al. |
| 4,593,361 | A | 6/1986 | Otten |
| 4,654,800 | A | 3/1987 | Hayashi et al. |
| 4,679,150 | A | 7/1987 | Hayashi et al. |
| 4,766,548 | A | 8/1988 | Cedrone et al. |
| 4,834,231 | A | 5/1989 | Awane et al. |

(Continued)

FOREIGN PATENT DOCUMENTS

| | | |
|---|---|---|
| EP | 0 085 546 A2 | 8/1983 |
| EP | 512413 | 11/1992 |
| EP | 0 817 138 A1 | 1/1998 |
| JP | 2001093 A | 1/1990 |
| JP | 5242363 A | 9/1993 |
| JP | 9062908 A | 3/1997 |
| WO | WO 97/24701 | 7/1997 |
| WO | WO 97/28510 | 8/1997 |

OTHER PUBLICATIONS

Brochure, "Introducing the Digital MenuBoard", Siren Technologies, Inc., ( www sirentech com).

(Continued)

Primary Examiner—Khoi H. Tran
(74) Attorney, Agent, or Firm—Walker Digital Management, LLC

(57) ABSTRACT

A vending machine handles a purchase transaction by receiving a payment, receiving a product selection from the customer, and dispensing the product indicated by the product selection. As part of the same transaction, the vending machine offers an information item such as an audio recording or a video recording. The vending machine also receives from the customer a destination address, which may be an e-mail address. The vending machine or a system of which it is part transmits the information item to the received destination address.

4 Claims, 11 Drawing Sheets

U.S. PATENT DOCUMENTS

| | | | |
|---|---|---|---|
| 4,906,828 A | 3/1990 | Halpern | |
| 5,091,713 A | 2/1992 | Horne et al. | |
| 5,117,407 A | 5/1992 | Vogel | |
| 5,243,515 A | 9/1993 | Lee | |
| 5,245,533 A | 9/1993 | Marshall | |
| 5,257,179 A | 10/1993 | DeMar | |
| 5,262,941 A | 11/1993 | Saladin et al. | |
| 5,267,452 A | 12/1993 | Zinsmeyer et al. | |
| 5,274,547 A | 12/1993 | Zoffel et al. | |
| 5,283,731 A | 2/1994 | Lalonde et al. | |
| 5,287,268 A | 2/1994 | McCarthy | |
| 5,297,031 A | 3/1994 | Gutterman et al. | |
| 5,302,811 A | 4/1994 | Fukatsu | |
| 5,309,355 A | 5/1994 | Lockwood | |
| 5,339,250 A | 8/1994 | Durbin | |
| 5,353,218 A | 10/1994 | DeLapa et al. | |
| 5,353,219 A | 10/1994 | Mueller et al. | |
| 5,367,452 A | 11/1994 | Gallery et al. | |
| 5,380,991 A | 1/1995 | Valencia et al. | |
| RE34,915 E | 4/1995 | Nichtberger et al. | |
| 5,420,606 A | 5/1995 | Begum et al. | |
| 5,434,394 A | 7/1995 | Roach et al. | |
| 5,440,336 A | 8/1995 | Buhro et al. | |
| 5,445,295 A * | 8/1995 | Brown | 221/3 |
| 5,450,938 A | 9/1995 | Rademacher | |
| 5,452,344 A | 9/1995 | Larson | |
| 5,459,306 A | 10/1995 | Stein et al. | |
| 5,481,094 A | 1/1996 | Suda | |
| 5,504,475 A | 4/1996 | Houdou et al. | |
| 5,504,675 A | 4/1996 | Cragun et al. | |
| 5,510,979 A | 4/1996 | Moderi et al. | |
| 5,511,646 A | 4/1996 | Maldanis et al. | |
| 5,572,653 A | 11/1996 | DeTemple et al. | |
| 5,581,064 A | 12/1996 | Riley et al. | |
| 5,592,375 A | 1/1997 | Salmon et al. | |
| 5,592,376 A | 1/1997 | Hodroff | |
| 5,592,378 A | 1/1997 | Cameron et al. | |
| 5,602,377 A | 2/1997 | Beller et al. | |
| 5,608,643 A | 3/1997 | Wichter et al. | |
| 5,611,052 A | 3/1997 | Dykstra et al. | |
| 5,612,868 A | 3/1997 | Off et al. | |
| 5,613,620 A | 3/1997 | Center et al. | |
| 5,615,269 A | 3/1997 | Micali | |
| 5,620,079 A | 4/1997 | Molbak | |
| 5,621,201 A | 4/1997 | Langhans et al. | |
| 5,621,640 A | 4/1997 | Burke | |
| 5,632,010 A | 5/1997 | Briechle et al. | |
| 5,701,252 A | 12/1997 | Facchin et al. | |
| 5,732,398 A | 3/1998 | Tagawa | |
| 5,734,150 A | 3/1998 | Brown et al. | |
| 5,748,485 A * | 5/1998 | Christiansen et al. | 700/234 |
| 5,774,868 A | 6/1998 | Cragun et al. | |
| 5,819,285 A | 10/1998 | Damico et al. | |
| 5,822,216 A * | 10/1998 | Satchell et al. | 700/232 |
| 5,822,736 A | 10/1998 | Hartman et al. | |
| 5,844,808 A | 12/1998 | Konsmo et al. | |
| 5,873,069 A | 2/1999 | Reuhl et al. | |
| 5,878,401 A | 3/1999 | Joseph | |
| 5,930,145 A | 7/1999 | Yuyama et al. | |
| 5,949,688 A * | 9/1999 | Montoya et al. | 700/235 |
| 5,997,928 A | 12/1999 | Kaish et al. | |
| 6,012,834 A | 1/2000 | Dueck et al. | |
| 6,021,394 A | 2/2000 | Takahashi | |
| 6,029,141 A | 2/2000 | Bezos et al. | |
| 6,049,777 A | 4/2000 | Sheena et al. | |
| 6,056,194 A | 5/2000 | Kolls | |
| 6,067,570 A | 5/2000 | Kreynin et al. | |
| 6,115,649 A | 9/2000 | Sakata | |
| 6,223,163 B1 | 4/2001 | Van Luchene | |
| 6,330,490 B1 * | 12/2001 | Kim et al. | 700/234 |
| 6,341,314 B1 | 1/2002 | Doganata et al. | |
| 6,397,193 B1 * | 5/2002 | Walker et al. | 705/16 |
| 6,449,658 B1 | 9/2002 | Lafe et al. | |
| 6,571,150 B2 * | 5/2003 | Arai et al. | 700/236 |
| 6,615,241 B1 | 9/2003 | Miller et al. | |
| 6,636,733 B1 | 10/2003 | Helferich et al. | |
| 6,708,203 B1 | 3/2004 | Makar et al. | |
| 2002/0107610 A1 * | 8/2002 | Kaehler et al. | 700/232 |
| 2003/0040838 A1 * | 2/2003 | Lagunzad et al. | 700/232 |
| 2004/0162633 A1 * | 8/2004 | Kraft et al. | 700/234 |

OTHER PUBLICATIONS

Rehayem, Gilbert, "Opinion: X-Press Betting", Information Systems & Technology, Ontario Lottery Corp.

"Cape Town", Reuters Ltd, Nov. 8, 1979, PM Cycle.

"Save the mark", Financial Times (London), Feb. 1, 1983, Section I, Men & Matters at p. 12.

Cook, Louise, "ConsumerWatch: Clip, Snip, Save", The Associated Press, Mar. 12, 1984, Business News Section.

Greene, Jan, "Farm bills please assns; National Grocers Association", Supermarket News, vol. 35, Dec. 23, 1985 at p. 6.

"POS spectrum: a lottery looks to POS for growth", UMI, Inc., POS News, Jan. 1989, vol. 5, No. 7, p. 8, ISSN: 0896-6230, CODEN: Bhorad.

Kuttner, Robert, "Computers May Turn The World Into One Big Commodities Pit", Business Week, Sep. 11, 1989, Section: Economic Viewpoint, No. 3123 at p. 17.

Schrage, Michael, "An Experiment In Economic Theory; Labs Testing Real Markets", The Record, Nov. 26, 1989, Section: Business at p. B01.

"Let's Play the Cash Register Receipts Lottery", The New York Times, Dec. 25, 1990, Section 1, p. 30, col. 4, Editorial Desk.

Nakayama, Atsushi, "Coca-Cola machines to be 'smarter'; the Teleterminal control system is aimed at keeping customers, and machines, satisfied", The Japan Economic Journal, Feb. 23, 1991, Section: Industry: Chemicals at p. 22.

Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.

"Philips offers customers financing through Citicorp; Philips Medical Systems North America, Citicorp North America Inc." Health Industry Today, Jun. 1991, Section: vol. 54, No. 6, p. 4, ISSN: 0745-4678.

Pelline, Jeff, "Travelers Bidding On Airline Tickets SF firm offers chance for cut-rate fares" The San Francisco Chronicle, Aug. 19, 1991, Sections: News at p. A4.

Del Rosso, Laura, "Ticket-bidding firm closes its doors; Marketel International; Brief Article", Travel Weekly, Mar. 12, 1992, Section: vol. 51, No. 21, p. 1, ISSN: 0041-2082.

Gilbert, Allan Z., "Operators can gain with creative merchandising", Automatic Merchandiser, Oct. 1992, p. 80, ISSN: 1061-1797.

"Coupons get serious; supermarkets use barcodes to prevent misredemptions", Chain Store Age Executive with Shopping Center Age, Oct. 1992, Section: vol. 68, No. 10, p. 68, ISSN: 0193-1199.

"Winn-Dixie/The Salvation Army Report Contributions For War Against Hunger", PR Newswire, Jun. 10, 1993, Section: Financial News.

Gelernter, David, "The Cyber-Road Not Taken; Lost on the Info-Highway? Here's Some Stuff that Could Really Change Your Life", The Washington Post, Apr. 3, 1994, Section: Outlook, p. C1.

Jones, Jeanne, "Data Readers Streamline Management; Scanner Technology Aids Retailers As Well As Plants, Wholesalers", The Houston Post, Jun. 26, 1994, Section: Business at p. D1.

Fiorini, Phillip, "'No Place For Penny?'/Smallest coin doesn't make cents to some", USA Today, Jul. 29, 1994, Section: News at p. 1A.

Smith, Alison, "Survey of UK Consumer Credit and Asset Finance", Financial Times, Nov. 3, 1994, Section: p. VI.

Andreoli, Tom et al., "Cast Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, Section: News at p. 8.

"Spain: BBV launches new card", Cards International, Jun. 22, 1995 at p. 5.

Knippenberg, Jim, "Will local radio empires strike back?", The Cincinnati Enquirer, Jul. 23, 1995, Section: Tempo at p. F01.

Brochure, "Cyber Bid", Net Fun Ltd., Copyright 1996.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.

Maras, Elliot, "Software opens doors to scientific machine menuing", Automatic Merchandiser, Feb. 1996, Section: p. 36, ISSN; 0002-7545.

Hadley, Kimberly, "Pastors praying anti-arson effort will burn bias", The Nashville Banner, Jul. 26, 1996, Section: News at p. A13.

Gapper, John, "NatWest reports rise in bad debt", Financial Times, Jul. 31, 1996, Section: News: UK; at p. 09.

Gilbert, Allan Z., "A call to action for wireless data communication", Automatic Merchandiser, Aug. 1996, Financial Management section.

"Lynx Technology: Lynx to provide business leasing programme through Schroder Leasing", M2 Presswire, Aug. 9, 1996.

Taylor, Paul, "Towards a dream market", Financial Times (London), Sep. 4, 1996, Section: Survey—FT IT; at p. 03.

"Public Internet Kiosks, Inc. Receives First Order For Its 'Internet Station'—The Vending Machine of the Future", PR Newswire, Sep. 16, 1996.

Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.

Hirschfeld, David, "Increasing Profits Through Automation", Independent Vendors Association Quarterly, Apr./May/Jun. 1997.

French, Simone A. et al., "A Pricing Strategy to Promote Low-Fat Snack Choices through Vending Machines", American Journal of Public Health, May 1997, vol. 87, No. 5.

"Avco Financial Services", National Home Furnishing Association, (http //www homefurnish comNHFA/avco htm), download date: May 23, 1997.

Website, "Catalina Marketing Corporation", (http //catalinamktg com/prodcdir htm), download date: May 29, 1997.

Nairn, Geoff, "The key to your identity: Falling costs will allow fingerprint verification to be widely used, reports Geoff Nairn", Financial Times (London), Jul. 15, 1997, Section: Technology; at p. 12.

"The United Computer Exchange, How It All Works", (http //www uce com/howitworks html), download date: Jul. 23, 1997.

"Classified 2000: The Internet Classifieds", Classifieds2000, Inc., (http //www classifieds2000 com/cgi-cls/Display exe?C2K+aboutus), download date: Aug. 6, 1997.

"General trading information and terms provided by tradingfloor. com", (http //www tradingfloor com/info htm), download date: Aug. 14, 1997.

"NASDAQ", Information Sheet, (http //home axford com/corfin/ corfl 1 htm), download date: Aug. 15, 1997.

Brochure, "For the Crew & the Customer: The Best Drive-Thru & Grill Service", Olivetti North America, Winter 1998.

"VendMaster: Windows and Vending Software, Reports", (http //www vendmaster com/reports_main html), download date: Feb. 6, 1998.

Turnis, Jane, "Charity Begins with Pepsi Recycling Can in Colorado Springs, Colo.", The Gazette (Colorado Springs), Dec. 9, 1998.

King, Brad, "Music competition; With MP3s under attack and major labels designing new standards, three Bay Area firms try to corner the market on online music", SF Weekly, Apr. 28, 1999, Section: Music.

PCT International Search Report for International Application No. PCT/US98/21216, filed Oct. 8, 1998, in the name of Tedesco et al., and entitled "Method And Apparatus For Dynamically Managing Vending Machine Inventory Prices", mailed May 4, 1999.

Ringle, Ken, "The Sell Phone: Dial 'M' for Munchies", The Washington Post, jun. 19, 1999, Section: Style, p. C01.

Walker, Leslie, "A Sales Pitch With That Soda?" The Washington Post, Jun. 24, 1999, Section: Financial, p. E01.

"Digital kiosks at train stations to offer news, music, games", Deutsche Presse-Agentur, Jul. 15, 1999, Section: International News.

"Mitsubishi's New ChipConnect Software Development Kits and Reference Designs Enable Web-Controlled Embedded Systems Using em Ware's EMIT Architecture", Business Wire, Jul. 19, 1999.

Heid, Jim, "The Hits Just Keep on Coming as Downloadable Music Rocks the Web", PC World, Aug. 1999.

"Asia's first EAT on Ice Opens", Travel Trade Gazette Asia, Oct. 1, 1999, Section: Business.

Skinner, Greg, "Digitalia: ratings and ravings", Kidscreen, Oct. 1, 1999, Section: New Media, The Cyber Space, p. 40.

"Briefing—Asia Information Technology", Asia Pulse, Feb. 18, 2000, Section: General News.

"Vending machines go high-tech", Journal of Business, Mar. 9, 2000, Section: vol. 15, No. 6, p. A1, ISSN: 10756124.

"USA Technologies Expands Distribution of TransAct Credit Card Device & Payment System", Business Wire, Apr. 27, 2000.

"USA Technologies Targets e-Port At Interactive Media Market; Innovative Internet Appliance Features at @d:tech Internet Conference; Adtech2000", Business Wire, May 9, 2000.

"Coinstar Launches Turn-Key Philanthropic Initiative for Supermarket Partners; Retailers Can Now Tailor Coins That Count Programs to Support Local Non-Profits", Business Wire, May 10, 2000.

"MP3.com and Djangos.com Partner to Re-Invent Retail Music Industry; Alliance Provides Consumers with Instant Online Access to Purchased CDs", PR Newswire, Jun. 14, 2000, Section: Financial News.

"Are in-store kiosks the future?", Music Week, Jun. 24, 2000, Section: p. 22.

"USA Technologies Files 15 More Patents to Protect e-Port Internet Appliance Device", Business Wire, Jun. 26, 2000.

"Marcus Theatres Corporation First to Offer eKiosk High-Speed Internet Access to Movie Goers", PR Newswire, Aug. 21, 2000.

"E-tailer Notes: The Outernet, planned entertainment chain . . . ", Audio Week, Aug. 28, 2000.

"Re Directorate", Regulatory News Service, Sep. 1, 2000.

Website: "USEDvending.com—New Personal Care Products Vending Machines", (http //www usedvending com/newpersonalcare htm), download date: Oct. 24, 2000.

Website: "e-vending.com homepage—Vending, Joke & Vending Machines", (http www e-vending com/jokes htm), download date: Oct. 24, 2000.

* cited by examiner

← 500

| PRODUCT NAME 502 | AMOUNT IN INVENTORY 504 | PRICE 506 |
|---|---|---|
| COLA | 10 | .75 |
| DIET COLA | 8 | .75 |
| LEMON-LIME SODA | 12 | .75 |
| ICED TEA | 6 | .60 |
| BOTTLED WATER | 14 | 1.00 |

FIG. 5

| INFORMATION ITEM IDENTIFIER 602 | INFORMATION ITEM DESCRIPTION 604 | INFORMATION PROVIDER 606 | NUMBER DISPENSED 608 | PRICE 610 |
|---|---|---|---|---|
| IN-0005 | "BEOWULF AND GRENDEL" MP3 | OLD ENGLISH ENTERTAINMENT | 10 | $0.75 |
| IN-0008 | "ROSENCRANZ'S REVENGE" TXT | REVISIONIST SHAKESPEARE CO. | 8 | $0.50 |
| IN-0013 | 2 MONTH SUPPLY OF DIGI-PET FOOD | DIGITAL PETWARES | 12 | GET 5 PEOPLE TO GET A DIGITAL PET |
| IN-0042 | CHEAT CODE FOR "DRAGONQUEST" | GAMESOFT | 6 | BUY 3 DRINKS FROM VENDING MACHINE |
| IN-0126 | TRAFFIC REPORT | TRAFFIC COP, INC. | 14 | $0.25 |

VENDING MACHINE IDENTIFIER: V-002

| TRANSACTION IDENTIFIER 702 | DATE/TIME 704 | PRODUCT VENDED 706 | INFORMATION ITEM IDENTIFIER 708 | TOTAL PRICE 710 | CUSTOMER IDENTIFIER 712 | DESTINATION ADDRESS 714 |
|---|---|---|---|---|---|---|
| T-001 | 9/10/2002 14:34 | COLA | IN-0005 | $1.50 | — | FROGG@POND.COM/ |
| T-002 | 9/10/2002 14:42 | BOTTLED WATER | — | $1.00 | — | — |
| T-003 | 9/10/2002 16:12 | ICED TEA | IN-0126 | $0.85 | C-532 | (203) 325-4433 |
| T-004 | 9/10/2002 16:31 | COLA | IN-0008 | $1.00 | — | 115.421.514.890 |
| T-005 | 9/10/2002 17:01 | DIET COLA | — | $0.75 | C-254 | — |

SYSTEM FOR VENDING PHYSICAL AND INFORMATION ITEMS

The present Application is a Continuation Application of commonly owned, co-pending U.S. patent application Ser. No. 09/713,001 entitled "SYSTEM FOR VENDING PHYSICAL AND INFORMATION ITEMS", filed Nov. 17, 2000; which claims the benefit of U.S. Provisional Patent Application No. 60/226,830, filed Aug. 22, 2000; and also claims the benefit of U.S. Provisional Patent Application No. 60/243,153, filed Oct. 25, 2000. The entire contents of these applications are incorporated by reference herein.

CROSS-REFERENCE TO RELATED APPLICATIONS COPY

The subject matter of this application is related to the following co-pending, commonly-assigned patent applications: Ser. No. 08/947,798, entitled "Method and Apparatus for Dynamically Managing Vending Machine Inventory Prices", filed Oct. 10, 1997; Ser. No. 09/012,163, entitled "Method and Apparatus for Automatically Vending a Combination of Products", filed Jan. 22, 1998; and Ser. No. 09/688,372, entitled "Method and Apparatus for Facilitating the Promotion of Sales at a Vending Machine", filed Oct. 10, 2000. The entire contents of these applications are incorporated herein by reference.

FIELD

The present invention is concerned with vending machines, and, more particularly, is concerned with vending machines capable of distributing both physical and information items.

BACKGROUND

Vending machines are well known and are employed to store and dispense a wide variety of merchandise, including beverages, snacks and sundries.

Vending machines provide benefits to both customers and proprietors. For customers, there is the convenience of self-service and twenty-four hour access. Similarly, vending machines are available as sales outlets for proprietors around the clock and without direct labor costs for the sales transactions themselves.

However, the simplicity of the vending machine experience is not in all ways advantageous. The customer's interaction with the machine, consisting of inserting payment, selecting a product to be purchased, and receiving the product, is sometimes not congruent with the brand image of the product purchased. For many products distributed by vending machines, and particularly beverages and some snacks, the brand of the product is highly cultivated by the product distributor or manufacturer to suggest favorable images having elements such as pleasure and fun. The typical vending machine experience does little to reinforce this brand image, except, perhaps, the presence of the brand displayed on the machine and on the product itself. While the product purchased may be pleasurable and fun in itself, the process of obtaining the product from the vending machine is routine and mechanistic.

It would be desirable if the experience of interacting with a vending machine were made enjoyable and entertaining to enhance and reinforce the brand messages promulgated by the distributors of products that are sometimes sold in vending machines. The present inventors have recognized that one way of enhancing the experience of interacting with the vending machine would be to expand the range of products available at the vending machine to include information items. Such information items may include audio recordings such as hit songs and/or video recordings such as music videos and may be selected to support and enhance the brand images of products sold through the vending machines.

SUMMARY OF THE INVENTION

According to an aspect of the invention, a method of operating a vending machine includes receiving a payment, receiving a product selection, offering an information item, receiving a destination address, dispensing a product indicated by the product selection, and transmitting the information item to a location specified by the received destination address.

The method may further include selecting the information item before the offering step. The selecting of the information item may be based on the received product selection. The payment may be received in the form of currency, i.e. either or both of coins and paper money. The product selection may be received via a push button on the vending machine. The offering of the information item may occur before receiving the payment or after dispensing the product or at other points in the transaction.

The method may be performed such that change is provided only if the information item is not accepted. The information item may be an audio recording or a video recording. The product may be a beverage or a snack. The destination address may be an e-mail address.

The offering of the information item may include displaying a notice at the vending machine. The method may include presenting the information item at the vending machine such that, if the information item is an audio recording, the presenting of the information item includes audibly reproducing the information item at the vending machine. Alternatively, if the information item is a video recording, the presenting of the information item may include displaying the information item at the vending machine.

The offering of the information item may include presenting a menu of information items to a customer at the vending machine as, for example, by displaying a menu of information items on a display device such as a touch screen.

The method may further include prompting a customer to enter the destination address. The offering of the information item may include stating a price for the information item.

According to another aspect of the invention, a vending system includes a payment device for receiving a payment, a selection device for receiving a product selection, an offer device for offering an information item, an input device for receiving a destination address, a dispensing device, responsive to the payment device, for dispensing a product indicated by the product selection, a transmitting device for transmitting the information item to a location specified by the received destination address, and a front panel on which the selection device and the offer device are installed.

The offer device may include a display which displays a notice concerning the information item. The input device may include a keyboard and/or a touch screen. The selection device may include a push button. The payment device may include a coin acceptor and/or a bill acceptor.

The method and apparatus of the present invention are advantageous in that the distribution of information items via vending machines may provide an additional source of revenue for vending machine proprietors. In addition, availability of information items through vending machines may add to the interest and enjoyment of customers who patronize vending machines, thereby leading to greater use of vending machines. Moreover, information items distributed through vending machines in accordance with the invention may be selected to enhance the brand image of physical products sold through the vending machines.

According to still another aspect of the invention, a method of operating a vending machine includes offering a first product and a first information item as a first package for a first price, offering a second product and a second information item as a second package at a second price, receiving a selection of one of the first package and the second package, receiving a payment, receiving a destination address, dispensing the first product and transmitting the first information item to a location specified by the received destination address if the first package was selected, and dispensing the second product and transmitting the second information item to a location specified by the received destination address if the second package was selected.

The first price may be the same as the second price.

By assembling bundles or packages that include the physical product dispensed by the vending machine as well as an information item, it is possible to practice revenue management techniques. Principles of revenue management are generally described in the above-referenced patent application Ser. No. 08/947,798. As one example, if a physical product is in great demand, it may be bundled with a relatively unpopular information item such as a relatively unpopular song, whereas unpopular physical products dispensed by the vending machines may be bundled with highly popular information items to promote more rapid sale of the unpopular physical product. In this way revenue management can be applied without explicitly changing the price of the product bundles. This is advantageous, since changing the price of products at a vending machine to reflect market conditions may risk offending the customers.

According to yet another aspect of the invention, a method of operating a vending machine includes receiving a payment, receiving a product selection, offering an information item, receiving an acceptance of the information item, dispensing a product indicated by the product selection, and transmitting the information item to a handheld device, such as a personal digital assistant (PDA), located in proximity to the vending machine.

BRIEF DESCRIPTION OF THE DRAWINGS

FIG. 5 is a tabular representation of an inventory database that is shown in FIG. 4;

FIG. 6 is a tabular representation of an information item database that is shown in FIG. 4;

FIG. 7 is a tabular representation of a transaction database shown in FIGS. 2 and 4;

DETAILED DESCRIPTION

The following definitions shall apply in this specification and in the appended claims:

| | |
|---|---|
| information item | a file or other unit of content stored in digital form, including audio recordings, video recordings, text files, games, software, and access codes to permit access to digital files. |
| destination address | an indication of a location to which an information item may be sent; includes an e-mail address, a phone number, an IP address, or a mailing address. |
| product | a physical object that may be dispensed by a vending machine. |
| vending machine | any automatic sales machine that allows payment to be exchanged for goods or services, including snack machines, beverage machines, automatic teller machines (ATMs), postage stamp dispensers, parking meters, electronic highway toll booths that deduct a toll charge from a motorist's pre-paid account or credit card, arcade games, slot machines and laundry machines. |

Figure 1:
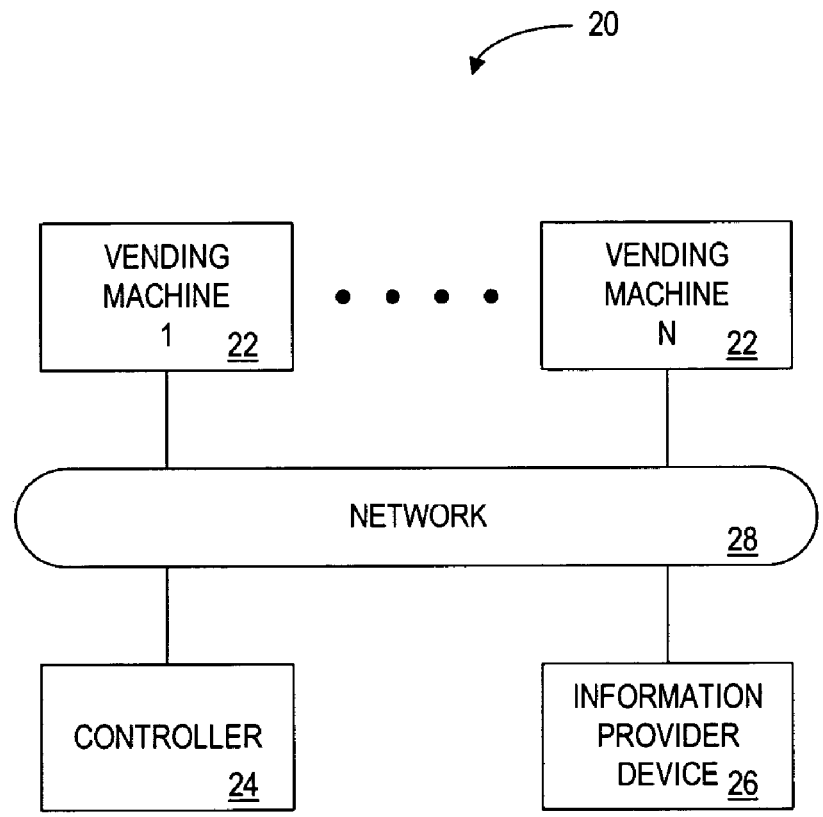
FIG. 1 is a block diagram of a system provided in accordance with the invention.

FIG. 1 is a block diagram representation of a system 20 provided in accordance with the invention. The system 20 includes vending machines 22, a controller 24, and an information provider device 26. A data communications network 28 permits the other components of the system 20 to be in data communication with each other. The network 28 may include one or more other communication networks. Among these may be the Internet, a local area network (LAN), a wide area network (WAN), a telephone line, a telecommunications cable, a radio channel, an optical communications link, an infrared communications channel and a satellite communications link. The network 28 may employ one or more of the following communications protocols: TCP/IP, Ethernet and Bluetooth. Although the network 28 is illustrated as being a single network, it may be made up of a number of different networks for allowing communication between various ones of the other components of the system 20.

Although only one information provider device 26 is shown in FIG. 1, it is contemplated that more than one information provider device may be in communication simultaneously or from time to time with other components of the system. It is also contemplated to entirely omit the information provider device 26 from the system 20.

Examples of the vending machines 22 and the controller 24 will be described below. The hardware aspects of the information provider device 26 may be constituted by conventional hardware, such as a conventional server computer. Appropriate programming for the information provider device 26 will become apparent from subsequent discussion.

Figure 2:
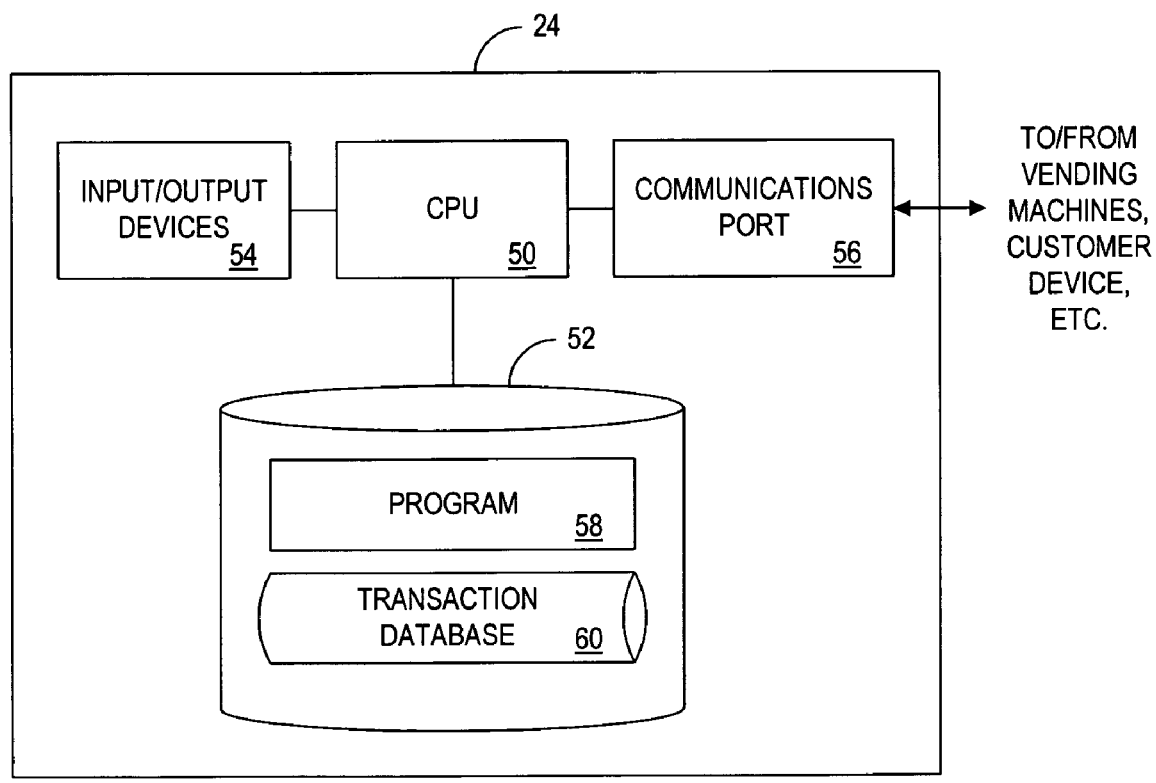
FIG. 2 is a block diagram of a controller that is part of the system of FIG. 1.

FIG. 2 is a block diagram showing the architecture of an illustrative controller 24. The controller 24 may be embodied, for example, as an RS6000 server, manufactured by IBM Corporation, as modified herein to execute the functions and operations of the present invention. The controller 24 includes known hardware components, such as a central processing unit (CPU) 50 in communication with each of a data storage device 52, input/output devices 54 and a communications port 56. The data storage device 52 preferably comprises an appropriate combination of magnetic, optical and/or semiconductor memory and may be constituted by one or more hard disks. The CPU 50 may be embodied as a single processor or a number of processors. The CPU 50 and the storage device 52 may each be, for example: (i) located entirely within a single computer or other computing device; or (ii) connected to each other by a remote communication medium, such as a serial port cable, telephone line or radio frequency transceiver.

The data storage device 52 stores a program 58 that controls the CPU 50 in accordance with the invention. Also stored in the data storage device 52 is a transaction database 60. The transaction database 60 may store information uploaded from the vending machines 22 and representing transactions carried out in accordance with the invention at the vending machines 22. The transaction database 60 will be described further below.

Figure 3:
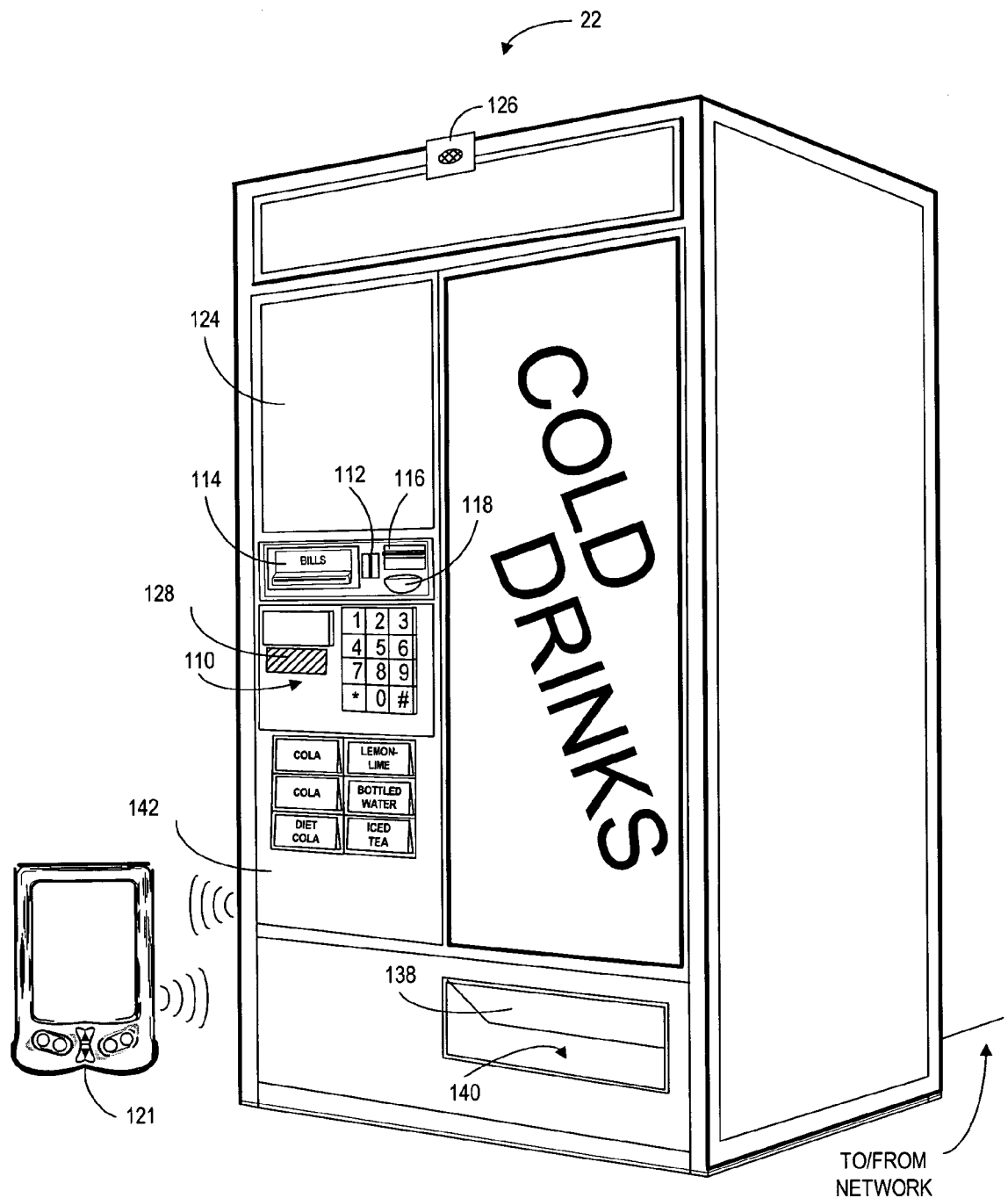
FIG. 3 is a perspective view of an embodiment of a vending machine with which the present invention may be applied.

FIG. 3 illustrates one exemplary vending machine 22 suitable for use with the present invention. Although specific exemplary vending machine 22, in the form of a beverage machine, is referred to throughout the detailed description, the present invention may be applied with any automatic sales machine that allows payment to be exchanged for goods or services. Payment can be presented through a variety of media including, but not limited to, coins, bills and other currencies, magnetic stripe cards such as credit cards, smart cards (whether pre-paid or linked to an account), and identification codes. It is also contemplated that payment for vended items may be made on-line, either before or after receiving the vended item.

As shown, vending machine 22 includes an input device 110 for receiving input from a customer indicating a product selection. Input device 110 may also be used for receiving input from an operator during stocking or maintenance of vending machine 22. Although input device 110, as illustrated, includes a set of alpha-numeric keys for providing input to vending machine 22, the input device could include a selector dial, a set of buttons associated with a respective set of item dispensers, a touch screen, or any other conventional input device. Input device 110 may also be, for example, an infrared (IR) port configured to communicate with a customer device 121 in the form of a PDA (personal digital assistant) or a cellular telephone.

Vending machine 22 may include more than one input device 110. For example, vending machine 22 may include an exterior input device 110 for receiving customer input and an interior input device (not shown) for receiving operator input. In the illustrated embodiment, input device 110 receives input data from operators and customers. Vending machine 22 may also include a recording device 126 such as a digital camera and/or a microphone.

An output device 124 may also be included. For example, in one embodiment, the output device 124 is a video display terminal, a liquid crystal display, or a touch screen. If the output device 124 is a touch screen, it will be appreciated that such device also functions as an input device.

Vending machine 22 may include additional output devices such as one or more audio speakers. Vending machine 22 may also include devices to facilitate payment, including a bill acceptor 114, a coin acceptor 112, a card reader 116 and a change dispenser 118.

Vending machine 22 dispenses products (e.g., beverage cans) at a dispenser tray 140 that is accessible via a door 138.

The output device 124 and input device 110, and other components seen in FIG. 3, are installed on a front panel 142 of the vending machine 22.

Figure 4:
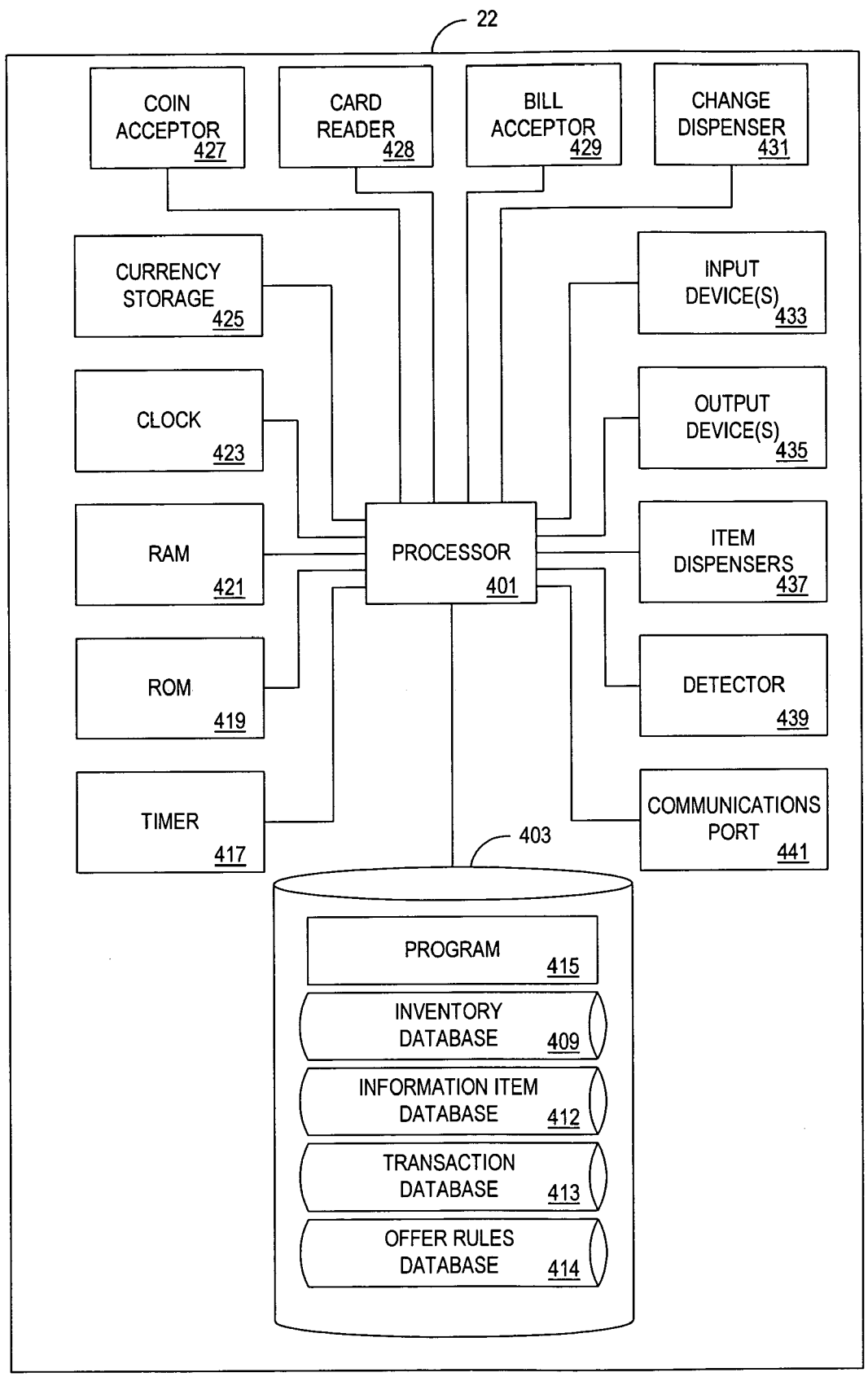
FIG. 4 is a block diagram of electronic and mechanical components of the vending machine of FIG. 3.

FIG. 4 is a schematic block diagram of vending machine 22 and its components. Vending machine 22 is controlled by central processing unit (CPU) 401 which may be any commonly manufactured microprocessor chip, such as the Pentium II manufactured by Intel Corporation. CPU 401 runs at a clock speed determined by clock 423 which is operatively connected to CPU 401.

CPU 401 is further operatively connected to standard computer components such as random access memory (RAM) 421, read-only memory (ROM) 419, input device(s) 433, output device(s) 435 and data storage device 403. RAM 421 may be one or more single inline memory module (SIMM) chips capable of storing a predetermined amount of data (typically measured in megabytes) and used by CPU 401 for temporary storage of processing instructions during operation of vending machine 22. ROM 419 may be at least one permanent non-erasable and non-rewritable memory chip or flash memory chip that stores initializing instructions to be used by CPU 401 during a startup routine performed by vending machine 22. Further functions of RAM 421 and ROM 419 will be apparent to one of ordinary skill in the art.

Input device(s) 433 may be one or more of the following commonly known peripherals used for inputting data to a dispensing device or to a microprocessor based system: a parallel port, a serial port, a keypad, a push button, a touch screen, a voice recognition device, an infrared (IR) port, a wireless receiver, and the like. Input device(s) 433 preferably include an external input device for use by a purchaser and a separate internal input device, accessible only by a servicer or operator of vending machine 22 after the device has been opened, or through a network or other remote connection. In this manner, a purchaser may enter his or her selections for products through the external input device and may interact with the vending machine 22 in other ways, and a servicer may access and update data stored by vending machine 22 through the internal input device. Input device(s) 433 may specifically include a keyboard that enables a customer to select an information item to be obtained via the vending machine 22, and to enter an address to which the information item is to be delivered. Input device(s) 433 may also include a mouse, track ball, touch pad or other pointing device that may support a graphical user interface at the vending machine 22.

Output device(s) 435 may be one or more of the following commonly known peripherals for outputting data from a microprocessor: a parallel or serial port, a cellular modem or a regular modem, a printer, a monitor, a touch screen, a speaker, an LED or LCD display, a voice synthesizer, and/or a combination of any of these devices. Output device(s) 435 preferably include an external output device for displaying or broadcasting messages to a purchaser and a separate internal output device, accessible only by a servicer or operator of vending machine 22 after the device has been opened, or through a network or other remote connection. In this manner, a servicer may receive data stored by vending machine 22 through the internal output device. Further applicable output devices will be apparent to one of ordinary skill in the art. In one preferred embodiment of the vending machine 22, a speaker and/or a display screen are provided to permit the vending machine to audibly and/or visibly present one or more information items that are offered by the vending machine 22. Either the entire information item may be presented, as in playing an entire song, or a sample may be provided.

Additionally, input device 433 and output device 435 may be one device, such as a communications port or a touch screen, that can both receive and transmit data. One purpose of the output device 435 may be to present a menu of information items that may be obtained by the customer through the vending machine 22. A touch screen, mouse or other pointing device may be included to permit the customer to select one of the information items presented in the menu.

The CPU 401 is also in communication with a data storage device 403. The data storage device 403 comprises an appropriate combination of magnetic, optical and/or semiconductor memory, and may include, for example, random access memory, read-only memory, a compact disk and/or a hard disk. The data storage device 403 stores a program 415 for controlling the CPU 401. The CPU 401 performs instructions of the program 415, and thereby operates in accordance with the present invention, and particularly in accordance with the methods described in detail herein. The program 415 may be stored in a compressed, uncompiled and/or encrypted format. The program 415 furthermore includes program elements that may be necessary, such as an operating system, a database management system and "device drivers" for allowing the CPU 401 to interface with computer peripheral devices. Appropriate program elements are known to those skilled in the art and need not be described in detail herein.

According to an embodiment of the present invention, the instructions of the program 415 may be read into a main memory from another computer-readable medium, such as from a ROM to RAM. Execution of sequences of the instructions in program 415 causes CPU 401 to perform the process steps described herein. In alternative embodiments hard-wired circuitry may be used in place of, or in combination with, software instructions for implementation of the processes of the present invention. Thus, embodiments of the present invention are not limited to any specific combination of hardware and software.

The storage device also stores an inventory database 409 for keeping track of the inventory of products present in the vending machine and a transaction database 413 for recording transactions carried out by the vending machine. Also stored in the storage device 403 are an information item database 412 for storing data concerning information items that may be offered via the vending machine 22, and an offer rules database 414 for storing data that indicates circumstances under which particular ones of the information items are to be offered. The databases 409, 412, 413 and 414 will be described in further detail below.

CPU 401 is further operatively connected to timer 417 which can be set, reset and read by CPU 401 to measure the passage of time. Alternatively, CPU 401 may use signals generated by clock 423 to measure the passage of time in place of timer 417, as will be apparent to one of ordinary skill in the art.

CPU 401 is further operatively connected to monitor and operate currency storage 425, coin acceptor 427, card reader 428, bill acceptor 429, change dispenser 431, item dispenser(s) 437, and detector 439. Currency storage 425 is equipped to store both physical currency and electronic forms of currency, such as e-cash or credits from a debit card, credit card or smart card, received by vending machine 22. Coin acceptor 427 accepts and determines an amount of money received from coins deposited into vending machine 22. Card reader 428 receives electronic currency from a card, such as a smart card, debit card or credit card and/or determines account information for an account owned by the card owner. The account information is stored and used to apply a charge against the account for a product selected and dispensed by vending machine 22, or for an information item to be obtained through vending machine 22. Card reader 428 may also be used to read information from "frequent shopper cards" issued to customers. Each frequent shopper card may uniquely identify a particular customer and may be linked to a customer account or customer profile accessible by vending machines in the network.

Bill validator 429 accepts and determines an amount of money received from monetary bills deposited into vending machine 22.

The vending machine 22 may also be arranged to receive payment via a customer's cellular phone. According to this known technique, the customer uses his or her cellular phone to initiate a telephone call to the vending machine. The customer then selects a product or products to be dispensed (and/or one or more information items), and the cost of the dispensed product and/or information item is charged to the customer's cellular phone account.

Change dispenser 431 dispenses any change that is due to a purchaser who deposits money into coin acceptor 427, card reader 428 or bill acceptor 429. The amount of change to be dispensed is determined by CPU 401 under control of the program 415. In a process not shown, but apparent to one of ordinary skill in the art, CPU 401 determines an amount of money that a purchaser has deposited, recognizes a product and/or information item that the purchaser has selected, and calculates the difference between the amount of money deposited and the amount to be charged for the product and/or information item. The difference may be dispensed to the purchaser through change dispenser 431 or otherwise credited to the purchaser or to a designated recipient. Change dispenser 431 may be operatively connected to currency storage 425 to dispense change from that device.

Detector 439 is a device that sends a signal to CPU 401 when a purchaser is detected near vending machine 22. Detector 439 may be used by vending machine 22 to initiate demand monitoring and suggestive sell functions as disclosed and discussed in commonly-assigned U.S. patent application Ser. No. 09/164,670, entitled "Method and Apparatus for Collecting and Applying Vending Machine Demand Information" (incorporated herein by reference). Detector 439 may be any one of the following types of devices: a motion detector, an infrared detector, an acoustic signal detector, a pressure detector mounted on the floor in front of vending machine 22 or any other device that may detect a presence of a customer when he or she is in proximity of vending machine 22 and which outputs a signal indicative of the presence of the purchaser. The detector 439 may also be operative to initiate playback or display of one or more information items available for acquisition via the vending machine 22. Detector 439 may also be used to initiate presentation of offers of information items.

CPU 401 is further in communication with communications port 441. Communications port 441 permits CPU 401, and hence vending machine 22, to engage in data communications with controller 24 and other components of the system 20.

FIG. 5 shows a table 500 that represents inventory database 409 that may be stored in a respective vending machine 22. Table 500 includes a column 502 in which the various products dispensed by the vending machine are listed, a column 504 which lists the respective quantities of the products on hand in the vending machine, and column 506, which stores data indicative of the prices of the respective products.

FIG. 6 shows a table 600 that represents an information item database 412 that may be stored in a respective vending machine 22. Column 602 in table 600 lists respective identifiers for the information items that may be distributed via the vending machine 22. Column 604 contains descriptions of the respective information items. Column 606 lists the providers of the information items. Data stored in column 608 indicates what quantity of each information item has been distributed via the vending machine 22. In column 610, the prices of the information items are listed. It will be noted that, in some cases, the "price" for an information item may be a requirement that the user perform an action.

FIG. 7 shows a table 700 that represents a transaction database 413 that may be stored in a respective vending machine 22. A similar database comprising data for all of the vending machines in the system may be stored as database 60 in the controller 24. Each record in the table 700 contains data generated during a single transaction.

The table 700 includes a column 702 for storing transaction identifiers. Transaction identifiers may be unique codes generated by the vending machine and associated with each transaction. Also included in table 700 is a column 704 for storing information indicative of the date and time at which the transaction took place. Column 706 stores information that indicates the product or products sold during the transaction. Column 708 stores information item identifiers which identify the information item, if any, that was distributed in connection with the respective transaction. It is contemplated that in some transactions more than one information item may be distributed, in which case more than one information item identifier would be stored in the entry under column 708 for the respective transaction.

Column 710 in table 700 stores data that indicates the total price charged for the transaction. Column 712 in table 700 contains listings of customer identifiers, if available, for the customers who carried out the transactions. Customer identifiers may be available if the customer paid by credit card or used a frequent shopper card or the like to identify themselves.

Column 714 in table 700 lists destination addresses that have been input by the customer to indicate a destination for delivery of the information item distributed as part of the respective transaction.

Figure 8:
FIG. 8 is a tabular representation of an offer rules database shown in FIG. 4.

FIG. 8 shows a table 800 that represents an offer rules database 414 that may be stored in a respective vending machine 22. Column 802 in table 800 lists conditions upon which offers of information items are to be made by the vending machine. Column 804 lists the corresponding information items to be offered upon the occurrence of the conditions listed in column 802. Among the conditions that may lead to offering of a particular information item are customer selection of a particular product, detection of a customer at the vending machine, the customer using a credit card to pay for the transaction, or a certain amount of change being due to the customer as a result of the transaction.

Figure 9:
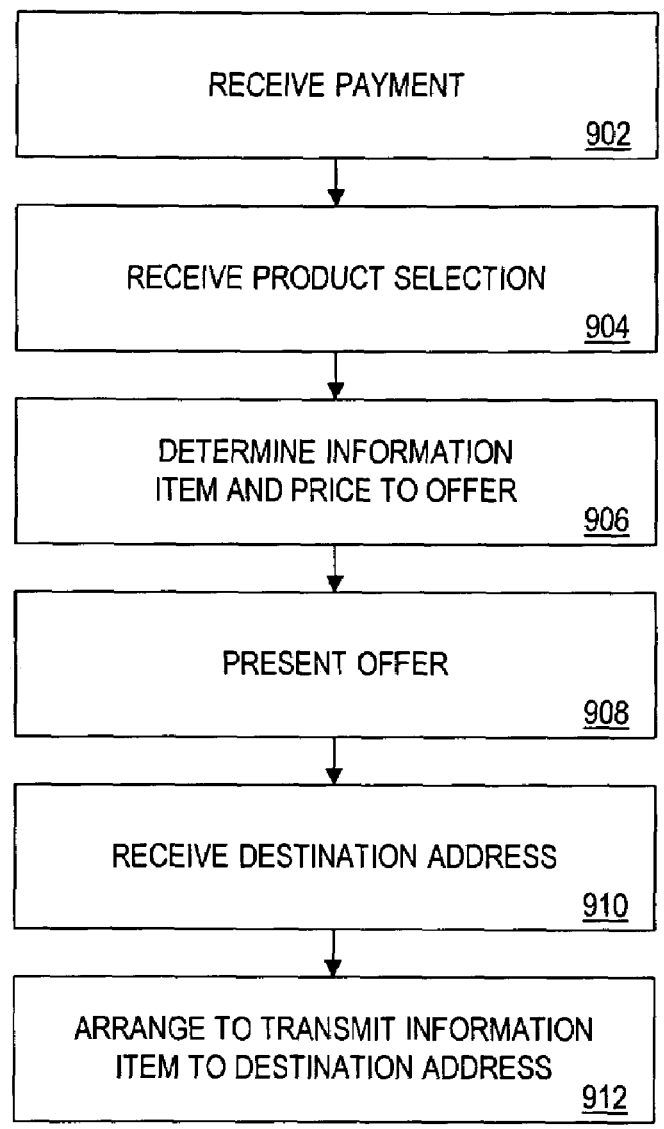
FIG. 9 is a flow chart that illustrates a method provided in accordance with an aspect of the invention.

FIG. 9 is a flow chart that illustrates a process for handling a transaction at a vending machine in accordance with the invention.

According to a first step 902 in the process of FIG. 9, the vending machine receives a payment. This may occur according to a number of known techniques, including receiving a coin or coins via coin acceptor 427, or receiving an item of paper currency via bill acceptor 429. As an alternative, a credit card account number may be inputted into the vending machine via a card reader 428 and the corresponding account charged. As still another alternative, a PDA or a transponder may be used to transmit an account number to the vending machine, and the corresponding account may then be charged for the price of the transaction.

It is also contemplated that the customer may call the vending machine with his or her cellular telephone with the amount of the transaction to be charged to the customer's cellular telephone account. Furthermore, payment to the vending machine may be arranged by the customer ahead of time via the Internet.

Next, at step 904, the vending machine receives from the customer an indication of a product selection. This may be done in a number of ways, including the customer actuating a conventional push button. It is also contemplated that the product could be selected via a cellular telephone, or that the customer may leave it up to the vending machine to select the product. When the vending machine only vends a single product, the submission of payment may indicate a product selection.

Next, at step 906, the vending machine determines an information item to offer to the customer and a price at which the information item is to be offered.

The information item to be offered may be selected based on the product selected by the customer. For example, the selection of a certain product by the customer may trigger the vending machine to offer to the customer a certain information item such as a certain piece of recorded music, at a given price. Alternatively, an information item may have been offered even before payment was received and the product selected. For example, the vending machine may continuously display a notice indicating that a certain information item such as a certain song is available through the vending machine. The notice may indicate that if a certain product is selected for vending, an information item is available as part of a package at a package price with the product in question. The vending machine may display several options, each of which is a package of a product to be vended through the machine and an associated information item.

The types of information items that may be distributed via the vending machines may include, as noted before, songs or other musical selections or other audio recordings, video recordings such as music videos, movies or television programs, software programs including game software, cheat codes for games, text files including so-called "e-books", news accounts in text form, and unlock codes that may be used to gain access to information from a website, for example.

The determination of which of a number of information items to offer may be made in a number of ways. For example, as noted before, the determination of an information item to offer may be based on the product selected by the customer. Alternatively, the information item to be offered may be dependent on the amount of payment provided by the customer or based on the amount of change due to the customer. The selection of an information item to offer may also be based on the manner in which the payment is provided. A number of information items may be offered to the customer sequentially or simultaneously in the form of a menu and the customer may be permitted to select one of the information items from the menu.

The customer may also be permitted to request a particular information item of interest and the vending machine may then seek to obtain that information item via a process like that provided by services such as Napster.

Step 908 indicates that the offer of the information item is presented to the customer. This may be done in various ways and at various times during the process. For example, the offer may be made continuously by displaying a notice via display 124 of the vending machine. This may occur before, during or after receipt of payment and/or receipt of the customer's product selection.

Offering an information item may also involve determining a price at which an information item should be offered. The price may have previously been assigned by the party that provides the information item and may be included in the above-described information item database. Alternatively, there may be a flat price for all information items.

Another possibility is that the information item pricing may be variable depending on factors such as the amount of change due to the customer. For example, if the customer deposits a dollar and selects a product that costs seventy-five cents, the vending machine may display a notice that states that a particular song may be obtained for the change due, i.e. twenty-five cents. If the product selected costs sixty cents, then the notice might have indicated that the price of the information item was forty cents. In either case, if the customer indicates that he or she desires to obtain the information item, then no change is provided to the customer.

It is also contemplated that particular information items may be paired with particular products to promote the sales of less popular products. Thus, for example, a product that is selling well may be paired with a rather obscure information item, or a product that is not selling well may be paired with an information item that is very popular. The popularity of an information item may be determined by publicly available information such as sales chart information.

As indicated at step 910, the vending machine receives from the customer data that represents a destination address to which the information item is to be sent. The destination address may take the form of an e-mail address, an Internet website address, a telephone number or a postal service mailing address. The data indicative of the destination address may be inputted via an input device on the vending machine such as a touch screen or a keyboard. Alternatively, the destination address may be inputted to the vending machine via a PDA 121 (FIG. 3) or some other customer device.

Finally, step 912 indicates that the vending machine arranges to transmit the information item to the destination address received at step 910. For example, the vending machine may send a message to the controller 24 indicating the information item selected by the customer and the inputted destination address. The controller 24 may then send a message to information provider device 26 with the same information. Assuming that the information provider device 26 stores the relevant information item, a data file corresponding to the information item is sent by the information provider device 26 to the indicated destination address. As other alternatives, the data file corresponding to the information item may be stored at the controller 24 and dispatched from the controller 24 to the destination address in response to a message from the vending machine, or the vending machine itself may store the information item and may send the information item directly to the destination address.

Figure 10:
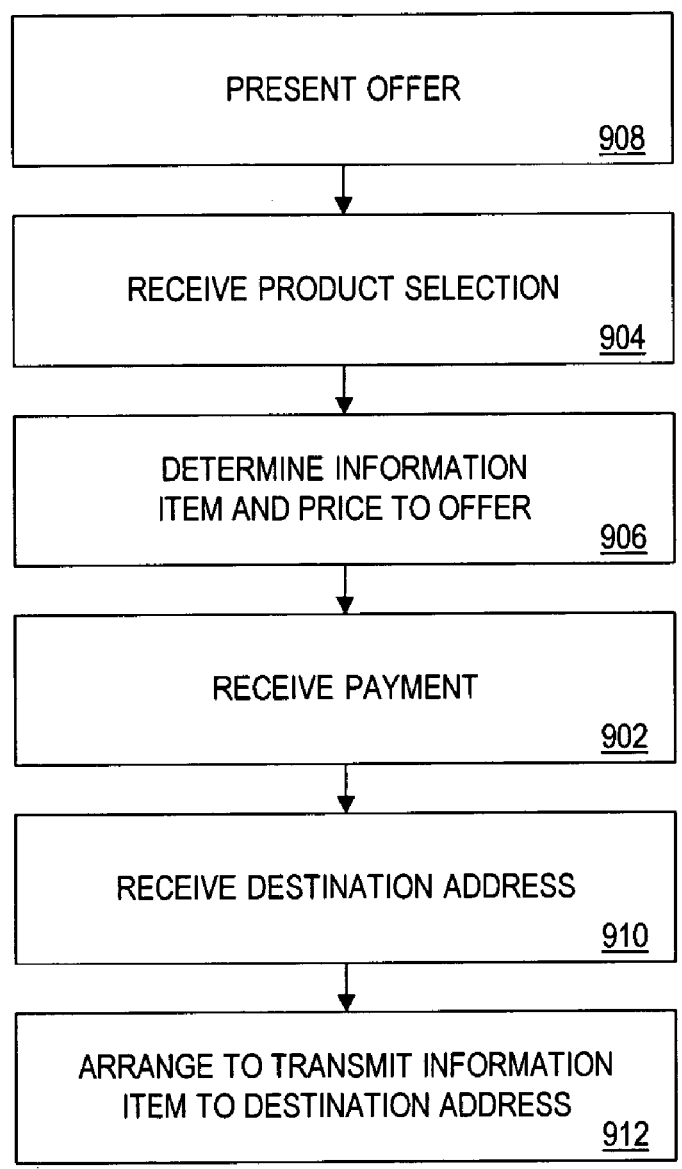
FIG. 10 is a flow chart that illustrates another method provided in accordance with an aspect of the invention.

FIG. 10 is a flow chart that illustrates another process for handling a transaction at a vending machine. The illustrated method corresponds to the method described with respect to FIG. 9, except the offering occurs before receiving the payment.

Figure 11:
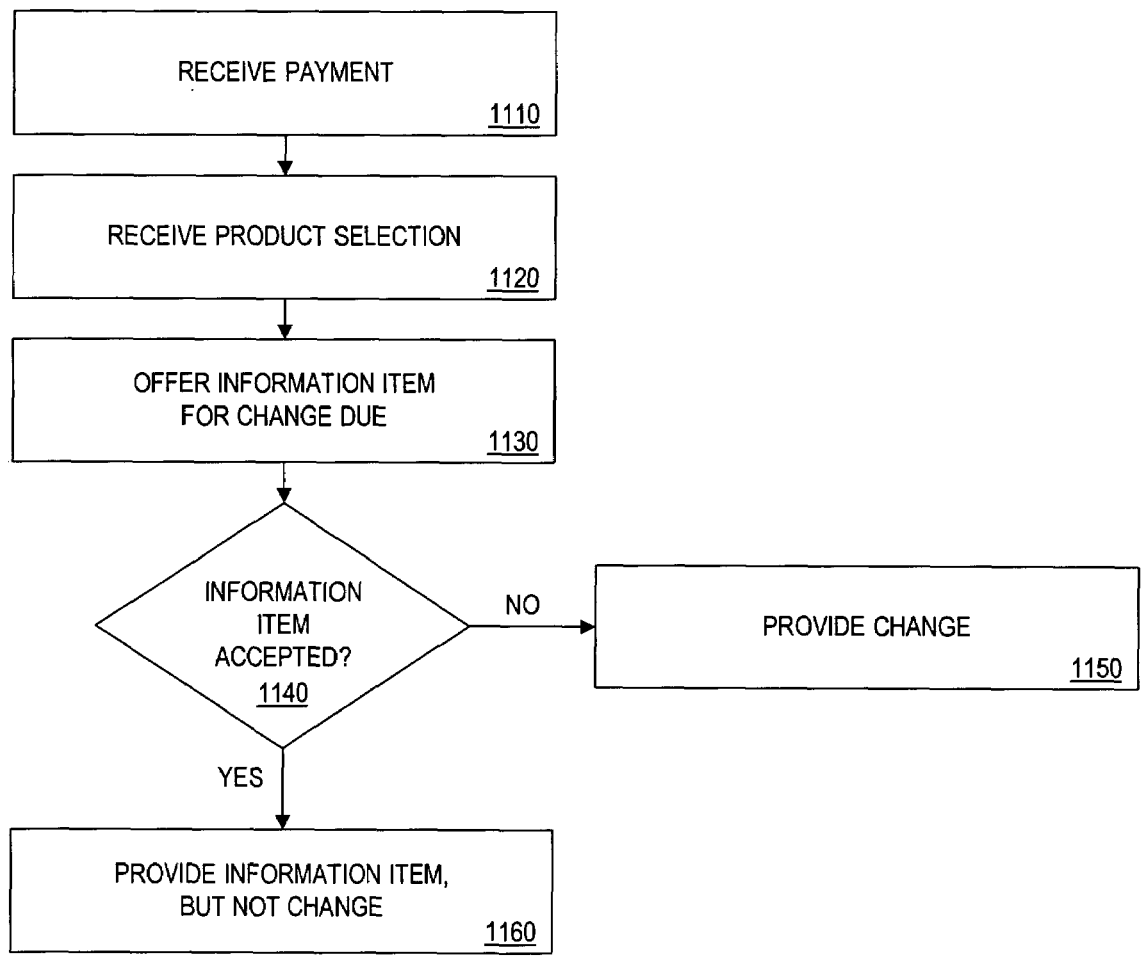
FIG. 11 is a flow chart that illustrates another method provided in accordance with an aspect of the invention.

FIG. 11 is a flow chart that illustrates another process for handling a transaction at a vending machine. At step 1110 the vending machine receives a payment. At step 1120, the vending machine receives from the customer an indication of a product selection. At step 1130, the information item is offered for the change due. At step 1140, it is determine whether the offer for the information item is accepted. If not, then the change is provided (step 1150). If the offer is accepted, then the information item is provided but the change is not provided (step 1160).

The following is an example of one way in which the present invention may be practiced:

A vending machine continuously plays a hit song via a speaker. A customer approaches the vending machine and views a notice on a touch screen that states: "You can have this great song downloaded to your home computer for just 25 cents". The customer inserts a dollar bill into a bill acceptor and selects a soda by pushing a button. The soda is dispensed. The customer presses an "accept" button on the touch screen and the touch screen prompts the customer to enter the customer's e-mail address. The customer actuates alpha-numeric areas on the touch screen to enter his e-mail address. Because the price of the soda is 75 cents, no change is dispensed. The vending machine sends an e-mail message to the entered e-mail address with the song as an audio file attachment to the e-mail message.

Although the preceding example provides for the information item to be specified in an offer, it is also contemplated that an undetermined information item may be offered. For example, an offer may propose to download next week's number one hit to the customer's home computer at a time in the future after the number one hit has been determined.

The previous example contemplates a separate charge for the information item. Alternatively, the information item may be provided free to the customer upon the customer selecting a particular product or upon selecting any product available for purchase through the vending machine.

In embodiments of the invention that have been described above, the system transmits an information item to an address that has been inputted into a vending machine by the customer. Alternatively, if the customer has a PDA, the vending machine may be arranged to transmit the information item directly to the PDA upon the customer indicating acceptance of the information item.

With the methods and apparatus of the present invention, the experience of patronizing a vending machine can be enriched by allowing the customer to obtain information items such as music recordings or music videos to be distributed to the customer's home computer. Thus, some of the enjoyment of visiting a music store can be incorporated in a visit to a vending machine. This may enhance the customer's perception of the vending experience and of the product distributed through the vending machine.

The methods described herein as sequences of steps are not limited to being performed in the order set forth herein, but may be performed in any order that is practical.

Although the present invention has been described with respect to preferred embodiments thereof, those skilled in the art will note that various substitutions, modifications and variations may be made with respect to the embodiments described herein without departing from the spirit and scope of the present invention.

What is claimed is:

1. A method, comprising:
    offering a plurality of physical products for sale via a vending machine;

maintaining an inventory of a plurality of data files available via the vending machine;

defining a first package by packaging a first subset of the plurality of offered physical products with a first subset of data files from the inventory of data files;

defining a second package by packaging a second subset of the plurality of offered physical products with a second subset of data files from the inventory of data files;

receiving an indication, from a customer, of a selection of the first package;

receiving an indication of payment provided by the customer in exchange for the first package;

dispensing, after the receiving of the indication of payment provided by the customer in exchange for the first package, the first subset of the plurality of offered physical products; and providing, to the customer, after the receiving of the indication of payment provided by the customer in exchange for the first package, the first subset of data files.

2. The method of claim 1, wherein the first subset of the plurality of offered physical products comprises one or more of the offered physical products that are associated with a first sales performance level, and wherein the second subset of the plurality of offered physical products comprises one or more of the offered physical products that are associated with a second sales performance level that is greater than the first sales performance level.

3. The method of claim 2, wherein the first subset of data files is associated with a first popularity, and wherein the second subset of data files is associated with a second popularity that is less than the first popularity.

4. The method of claim 3, further comprising:

determining the first and second popularities.

* * * * *